(12) United States Patent
Ward

(10) Patent No.: US 12,236,764 B2
(45) Date of Patent: *Feb. 25, 2025

(54) DETERMINING AREAS OF INTEREST IN VIDEO BASED AT LEAST ON A USER'S INTERACTIONS WITH THE VIDEO

(71) Applicant: The ADT Security Corporation, Boca Raton, FL (US)

(72) Inventor: Shy Ward, Flower Mound, TX (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,531

(22) Filed: Oct. 6, 2023

(65) Prior Publication Data

US 2024/0038041 A1    Feb. 1, 2024

Related U.S. Application Data

(63) Continuation of application No. 18/088,373, filed on Dec. 23, 2022, now Pat. No. 11,823,540.

(60) Provisional application No. 63/294,983, filed on Dec. 30, 2021.

(51) Int. Cl.
   G08B 13/196      (2006.01)
   G06V 10/25       (2022.01)
   G06V 20/52       (2022.01)

(52) U.S. Cl.
   CPC ....... *G08B 13/19682* (2013.01); *G06V 10/25* (2022.01); *G06V 20/52* (2022.01)

(58) Field of Classification Search
   CPC ...... G06V 10/25; G06V 10/774; G06V 20/46; G06V 20/52; G08B 13/19615; G08B 13/19682
   See application file for complete search history.

(56) References Cited

U.S. PATENT DOCUMENTS

| | | |
|---|---|---|
| 8,358,342 B2 | 1/2013 | Park |
| 8,869,198 B2 | 10/2014 | Riveiro Insua et al. |
| 9,530,060 B2 | 12/2016 | Zhang et al. |
| 9,589,595 B2 | 3/2017 | Gao et al. |
| 9,715,901 B1 | 7/2017 | Singh et al. |
| 10,304,319 B2 | 5/2019 | Sager |
| 10,462,341 B1 | 10/2019 | Fu et al. |
| 10,863,159 B2 | 12/2020 | Oh et al. |
| 11,055,537 B2 | 7/2021 | Torabi et al. |
| 2012/0189066 A1 | 7/2012 | Kameyama et al. |
| 2018/0270517 A1 | 9/2018 | Maillot et al. |
| 2019/0079941 A1 | 3/2019 | Sarkar et al. |
| 2019/0172493 A1 | 6/2019 | Khan et al. |
| 2019/0294631 A1 | 9/2019 | Alcantara et al. |
| 2021/0125065 A1* | 4/2021 | Turcot .................. G06N 3/084 |

(Continued)

*Primary Examiner* — Anner N Holder
(74) *Attorney, Agent, or Firm* — Weisberg I.P. Law, P.A.

(57) ABSTRACT

According to one or more embodiments, an interaction device is provided. The interaction device includes processing circuitry configured to render for display a first premises security video comprising a plurality of frames, determine a user interaction with a playback of the first premises security video, determine a plurality of logical weights associated with the plurality of frames based at least on the user interaction, train a machine learning model based at least on the plurality of logical weights, and perform a premises security system action based at least on the trained machine learning model.

20 Claims, 8 Drawing Sheets

(56) References Cited

U.S. PATENT DOCUMENTS

2022/0092833 A1 3/2022 Kerzner et al.
2022/0101630 A1 3/2022 Arrison et al.

* cited by examiner

DETERMINING AREAS OF INTEREST IN VIDEO BASED AT LEAST ON A USER'S INTERACTIONS WITH THE VIDEO

CROSS-REFERENCE TO RELATED PATENT APPLICATION

This application is a Continuation of and claims priority to U.S. Utility patent application Ser. No. 18/088,373, filed on Dec. 23, 2022, entitled DETERMINING AREAS OF INTEREST IN VIDEO BASED AT LEAST ON A USER'S INTERACTIONS WITH THE VIDEO, which claims priority to U.S. Provisional Patent Application Ser. No. 63/294,983, filed Dec. 30, 2021, entitled METHOD FOR DETERMINING AREAS OF INTEREST IN VIDEO, SECURELY AND PRIVATELY DRIVEN BY USERS' INTERACTIONS WITH VIDEO, the entirety of both of which are incorporated herein by reference.

TECHNICAL FIELD

This disclosure relates to methods and premises security systems, and in particular to determining areas of interest in video such as in a premises security system video based on a user's interaction with the video.

BACKGROUND

In existing video-based monitoring systems, detection of objects, person and/or sounds are method(s) used to determine areas of interest in the video. For example, the images and/or sounds recorded in the video are analyzed to determine if an object, person and/or sound is present. This approach generally works as most people are interested in identifying those type of things (e.g., objects, sounds, person, etc.) in their videos.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
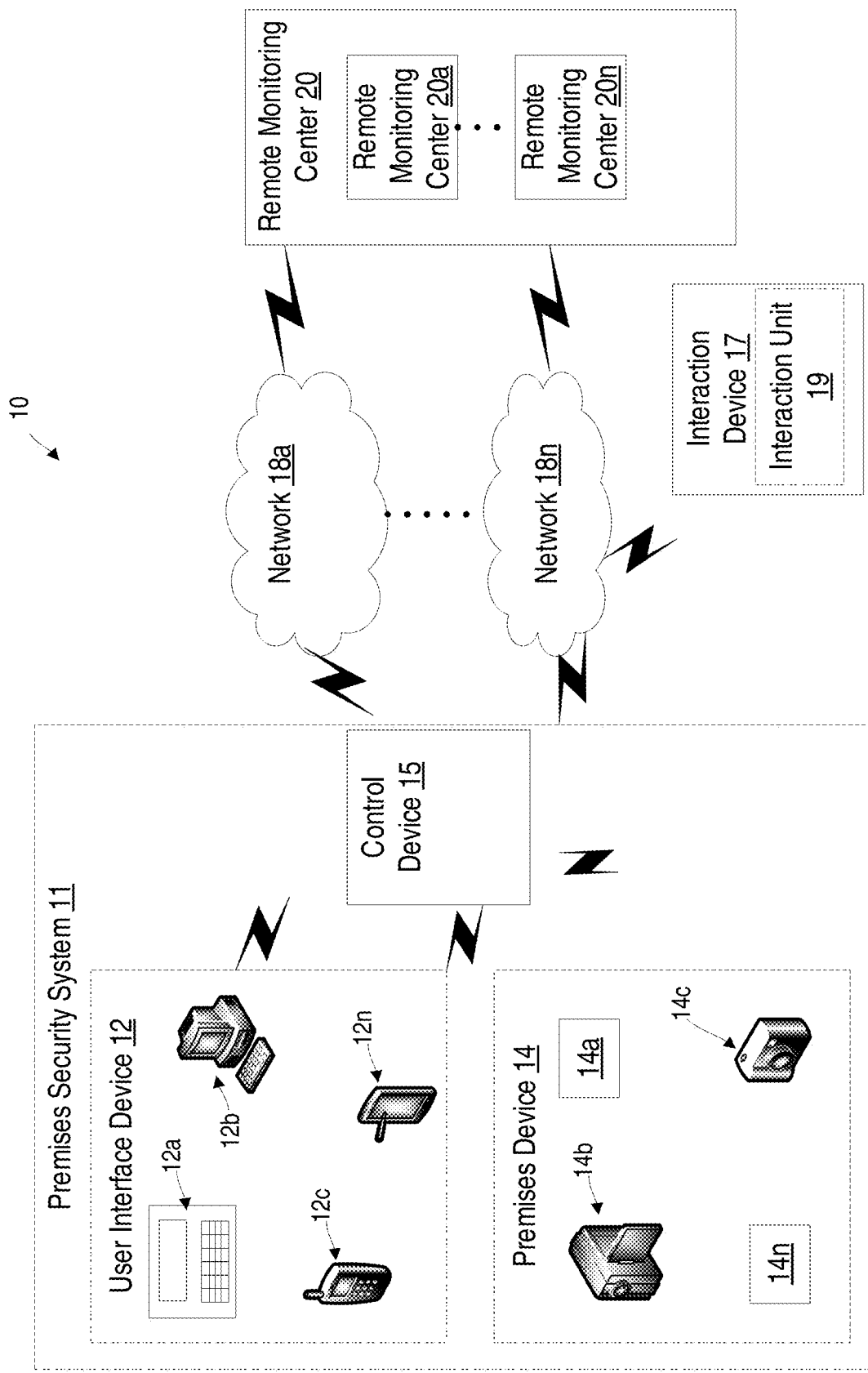
FIG. 1 is a diagram of an example system comprising a premises security system according to principles disclosed herein.

Some embodiments advantageously provide a method, device, and system for determining areas of interest in video such as in a premises security system video based on a user's interaction with the video (e.g., user's interaction with playback of at least a portion of the video).

One or more embodiments described herein relate to determining potential areas of interest in a video and/or image at least in part by building and/or deriving a weighted statistical model based on user interaction with the video (e.g., interaction with playback of at least a portion of the video). That is, a user's interaction with a device while viewing the video is used to build the weighted statistical model. In some embodiments, the weighted statistical model may be a modified page ranking algorithm, where the results are driven by user interaction with the video, rather than the number of times a page was referenced (as with a standard page ranking algorithm).

The derived weighted model may be specifically tuned to a given user and/or the video generated by the camera. In one or more embodiments, the derived weighted model may also be specifically tuned to what each user deems as something of interest.

Before describing in detail exemplary embodiments, it is noted that the embodiments may reside in combinations of apparatus components and processing steps related to determining areas of interest in video, such as in a premises security system video based on a user's interaction with the video (e.g., interaction with playback of the video). Accordingly, system and method components may be represented where appropriate by conventional symbols in the drawings, showing only those specific details that facilitate understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to the drawing figures in which like reference designators refer to like elements there is shown in FIG. 1 a system designated generally as "10." System 10 may include premises security system 11 where premises security system 11 includes and/or is associated with one or more user interface devices 12a to 12n (collectively referred to as "user interface device 12"), one or more premises devices 14a to 14n (collectively referred to as "premises device 14"), and control device 15. System 10 may include an interaction device 17 for interacting with a video and/or images provided/streamed to the interaction device 17 from, for example, premises device 14, control device 15, other device(s) associated with premises security system 11, and/or interacting with video and/or images captured by a camera in interaction device 17. For example, interaction device 17 may include interaction unit 19 for determining areas of interest in video such as in a premises security system video based on a user's interaction with the video, as described herein. In one or more embodiments, interaction unit 19 may be located in another entity in system 10 illustrated in FIG. 1, and may perform the same or similar function(s) regardless of which entity it is located in (e.g., whether in the control device 15, the interaction unit 17, network 18, or remote monitoring center 20). In some embodiments, one or more components and/or functionalities of interaction device 17 and/or interaction unit 19 may be distributed among a plurality of devices, e.g., one or more of premises device 14, control device 15, interaction device 17, network 18, and/or remote monitoring cente 20.

In one or more embodiments, interaction device 17 may be one or more of a wireless device, mobile device, tablet, personal computer, etc., that include a software application for viewing and interacting with the video/images.

System 10 may further include one or more networks 18a to 18n (collectively referred to as "network 18"), and one or more remote monitoring centers 20a to 20n (collectively referred to as "remote monitoring center 20"), communicating with each other or with at least one other entity in system 10.

User interface device 12 may be a wireless device (e.g., interaction device 17 acting as a user interface) that allows a user to communicate with control device 15. User interface device 12 may be a portable control keypad/interface 12a, computer 12b, mobile phone 12c and tablet 12n, among other devices that allow a user to interface with control device 15 and/or one or more premises devices 14. User interface device 12 may communicate at least with control device 15 using one or more wired and/or wireless communication protocols. For example, portable control keypad 12a may communicate with control device 15 via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, user interface device 12.

Premises devices 14 may include one or more types of sensors, control and/or image capture devices. For example, the types of sensors may include various safety related sensors such as motion sensors, infrared sensors, fire sensors, heat sensors, carbon monoxide sensors, flooding sensors and contact sensors, among other sensor types. The premises devices 14 may include, for example, one or more lifestyle (e.g., home automation) related devices configured to adjust at least one premises setting such as lighting, temperature, energy usage, door lock and power settings, among other settings associated with the premises or devices on the premises. Image capture devices may include a digital camera and/or video camera, among other image captures devices. Premises device 14 may communicate with control device 15 via proprietary wireless communication protocols and may also use Wi-Fi. Other communication technologies can also be used, and the use of Wi-Fi is merely, an example. Various additional sensors and control and/or image capture devices may relate to life safety or lifestyle depending on both what the sensors, control and image capture devices do and how these sensors, control and image devices are used by system 10.

Control device 15 may provide one or more of management functions, monitoring functions, analysis functions, control functions such as power management, premises device management and alarm management/analysis, among other functions to premises security system 11. In particular, control device 15 may manage one or more life safety and lifestyle features. Life safety features may correspond to security system functions and settings associated with premises conditions that may result in life threatening harm to a person such as carbon monoxide detection and intrusion detection. Lifestyle features may correspond to security system functions and settings associated with video capturing devices and non-life-threatening conditions of the premises such as lighting and thermostat functions.

Control device 15 may communicate with network 18 via one or more communication links. In particular, the communications links may be broadband communication links, such as a wired cable modem or Ethernet communication link, and digital cellular communication link, e.g., long term evolution (LTE) and/or 5G based link, among other broadband communication links. Broadband as used herein may refer to a communication link other than a plain old telephone service (POTS) line. Ethernet communication link may be an IEEE 802.3 or 802.11 based communication link. Network 18 may be a wide area network, local area network, wireless local network and metropolitan area network, among other networks. Network 18 provides communications among one or more of control device 15, remote monitoring center 20 and interaction device 17. In one or more embodiments, control device 15 may be part of premises device 14 or user interface device 12. In one or more embodiments, control device 15 may include interaction unit 19.

While control device 15 is illustrated as being a separate device from user interface device 12 and premises device 14, in one or more embodiments, control device 15 may be integrated with one or more user interface devices 12 and/or premises devices 14 and/or other entity or device located at premises associated with premises security system 11. In one embodiment, interaction device 17 provides functions of one or more of user interface device 12 and control device 15.

While interaction device 17 is described as within the context of a premises security system, the teachings described herein for determining areas of interest in a video are equally applicable to other types of systems, devices, etc., where a user is able to interact with playback of a video. Example implementations, in accordance with one or more embodiments, of control device 15 and interaction device 17 discussed in the preceding paragraphs will now be described with reference to FIGS. 2 and 3.

Figure 2:
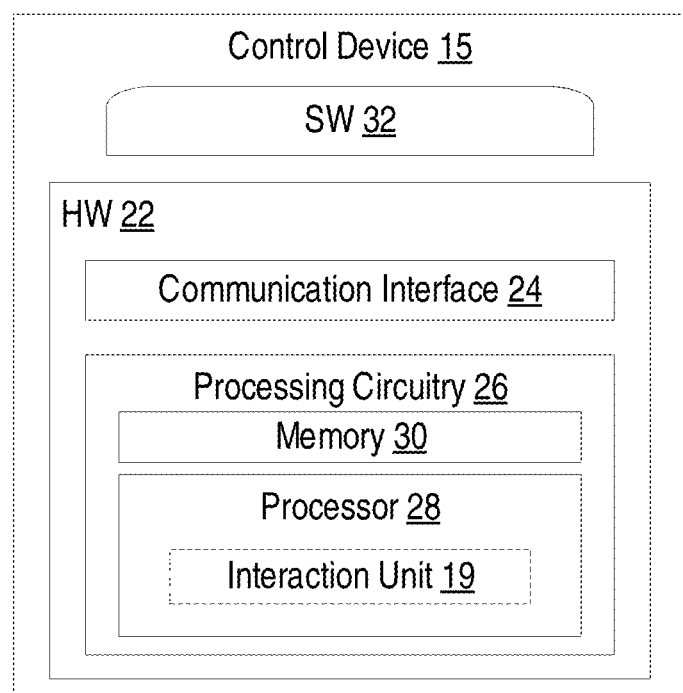
FIG. 2 is a block diagram of a control device according to some embodiments of the present disclosure.

With respect to FIG. 2, the example system 10 includes a control device 15 that includes hardware 22 enabling the control device 15 to communicate with one or more entities in system and to perform one or more functions described herein. The hardware 22 may include a communication interface 24 for setting up and maintaining at least a wired and/or wireless connection to one or more entities in system 10 such as remote monitoring center 20, premises device 14, user interface device 12, optionally interaction device 17, etc.

In the embodiment shown, the hardware 22 of the control device 15 further includes processing circuitry 26. The processing circuitry 26 may include a processor 28 and a memory 30. In particular, in addition to or instead of a processor, such as a central processing unit, and memory, the processing circuitry 26 may comprise integrated circuitry for processing and/or control, e.g., one or more processors and/or processor cores and/or field programmable gate arrays (FPGAs) and/or application specific integrated circuits (ASICs) adapted to execute instructions. The processor 28 may be configured to access (e.g., write to and/or read from) the memory 30, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM).

Thus, the control device 15 further has software 32 stored internally in, for example, memory 30, or stored in external memory (e.g., database, storage array, network storage device, etc.) accessible by the control device 15 via an external connection. The software 32 may be executable by the processing circuitry 26. The processing circuitry 26 may be configured to control any of the methods and/or processes described herein and/or to cause such methods, and/or processes to be performed, e.g., by control device 15. Processor 28 corresponds to one or more processors 28 for performing control device 15 functions described herein. The memory 30 is configured to store data, programmatic software code and/or other information described herein. In some embodiments, the software 32 may include instructions that, when executed by the processor 28 and/or processing circuitry 26, causes the processor 28 and/or processing circuitry 26 to perform the processes described herein with respect to control device 15. For example, processing circuitry 26 of the control device 15 may include interaction unit 19 which is configured to perform one or more interaction based functions described herein such as with respect to determining areas of interest in video such as in a premises security system video based on a user's interaction with the video. Alternatively, interaction unit 19 may be installed in interaction device 17.

Figure 3:
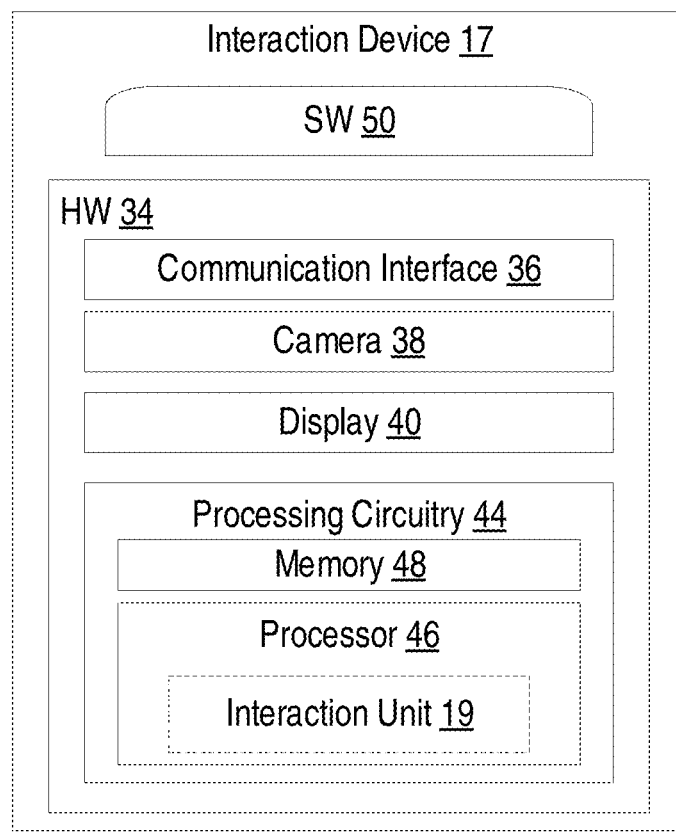
FIG. 3 is a block diagram of an interaction device according to some embodiments of the present disclosure.

With respect to FIG. 3, the example system 10 includes an interaction device 17 that includes hardware 34 enabling the interaction device 17 to communicate with one or more entities in system 10 and to perform one or more functions described herein. The hardware 34 may optionally include a communication interface 36 for setting up and maintaining at least a wired and/or wireless connection to one or more entities in system 10 such as premises device 14, user interface device 12, control device 15, etc. In one example, communication interface 36 is configured to receive one or more videos from premises security system 11, network 18 and/or remoting monitoring center 20 for playback by interaction device 17.

In the embodiment shown, the hardware 34 of the interaction device 17 may further include camera 38 for capturing one or more video(s) and/or images. Interaction device 17 may further include a display 40 such as an interactive or touchscreen display for allowing the user to interact with one or more of a video and/or image.

Interaction device 17 includes processing circuitry 44. The processing circuitry 44 may include a processor 46 and a memory 48. In particular, in addition to or instead of a processor, such as a central processing unit, and memory, the processing circuitry 44 may comprise integrated circuitry for processing and/or control, e.g., one or more processors and/or processor cores and/or FPGAs and/or ASICs adapted to execute instructions. The processor 46 may be configured to access (e.g., write to and/or read from) the memory 48, which may comprise any kind of volatile and/or nonvolatile memory, e.g., cache and/or buffer memory and/or RAM and/or ROM and/or optical memory and/or EPROM.

Thus, the interaction device 17 further has software 50 stored internally in, for example, memory 48, or stored in external memory (e.g., database, storage array, network storage device, etc.) accessible by the interaction device 17 via an external connection. The software 50 may be executable by the processing circuitry 44. The processing circuitry 44 may be configured to control any of the methods and/or processes described herein and/or to cause such methods, and/or processes to be performed, e.g., by interaction device 17. Processor 46 corresponds to one or more processors 46 for performing interaction device 17 functions described herein. The memory 48 is configured to store data, programmatic software code and/or other information described herein. In some embodiments, the software 50 may include instructions that, when executed by the processor 46 and/or processing circuitry 44, causes the processor 46 and/or processing circuitry 44 to perform the processes described herein with respect to interaction device 17. For example, processing circuitry 44 of the interaction device 17 may include interaction unit 19, which is configured to perform one or more interaction device 17 functions as described herein such as with respect to determining areas of interest in video such as in a premises security system video based on a user's interaction with the video.

Although FIGS. 1-3 show interaction unit 19 as being within a respective processor, this unit may be implemented such that a portion of the unit is stored in a corresponding memory within the processing circuitry. In other words, the unit may be implemented in hardware or in a combination of hardware and software within the processing circuitry.

Figure 4:
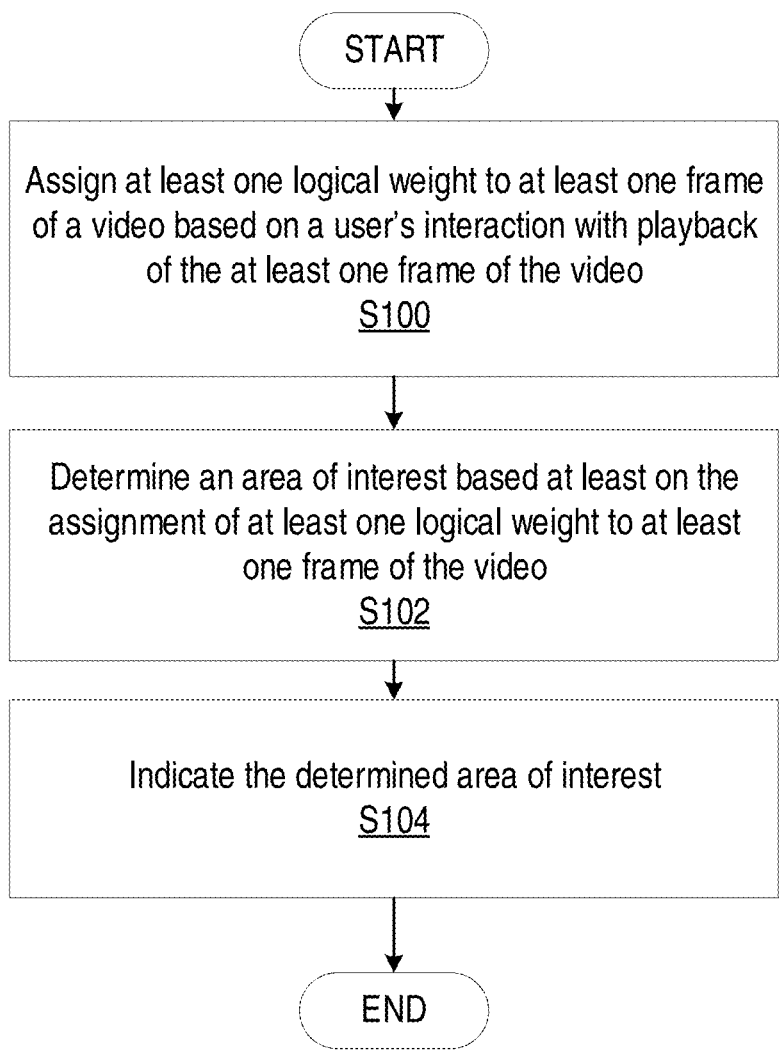
FIG. 4 is a flowchart of an example process according to some embodiments of the present disclosure.

FIG. 4 is a flowchart of an example process implemented by an interaction device 17 according to one or more embodiments of the present disclosure. One or more blocks described herein may be performed by one or more elements of interaction device 17 such as by one or more of processing circuitry 44 (including the interaction unit 19), processor 46, etc. Interaction device 17 is configured to assign (Block S100) at least one logical weight to at least one frame of a video based on a user's interaction with playback of the at least one frame of the video, as described herein. Interaction device 17 is configured to determine (Block S102) an area of interest based at least on the assignment of at least one logical weight to at least one frame of the video, as described herein. Interaction device 17 is configured to indicate (Block S104) the determined area of interest, as described herein.

According to one or more embodiments, the user's interaction with playback of the at least one frame of the video may be defined as at least one predefined user interaction where the at least one predefined user interaction includes at least one of: scrolling forward through the video, scrolling backwards through the video, zooming in on a portion of the video, or pausing the video on a specific frame for a predetermined amount of time. For example, a user may interact with the video via interaction device 17 that may be a wireless device, mobile device, interface device 12, personal computer, and/or any other device that has a displaying and at least one user input for a user to interaction with the video (e.g., interact with the playback of the video).

According to one or more embodiments, each predefined user interaction may correspond to a different logical weight. According to one or more embodiments, an amount of the at least one logical weight that is assigned to at least one frame of the video is based on a type of user interaction with playback of the at least one frame of the video. According to one or more embodiments, the logical weight may correspond to multiplying an amount the at least one frame has been viewed by a predefined multiplier. According to one or more embodiments, the processing circuitry 44 may be further configured to generate a histogram of a frame view dispersion of the video where the determination of the area of interest corresponds to at least one frame having a frame view quantity greater than a mean frame view quantity of a plurality of frames of the video.

According to one or more embodiments, one or more logical weights may be assigned by an interaction with a video by multiple users. For example, at least two household members may access and playback a video where the interaction of these two household members with playback of the video may be taken into account when determining the logical weights to apply to at least a portion of the video. In one or more embodiments, the logical weights may be determined or assigned based on user type. For example, an administrator (e.g., head of household user) may be given more weight (e.g., greater multiplier quantity) than a non-administrator user, such as a child. In this example, the same interaction with the video may lead to different logical weights being applied based on whether the user is an administrator or non-administrator, i.e., based on user type.

In one or more embodiments, a device (e.g., interaction device 17) for determining an area of interest in a premises based on a captured video is provided. The interaction device 17 includes processing circuitry 44 and/or interaction unit 19 configured to determine an area of interest based at least on based on a user's interaction with playback of at least one frame of the video. According to one or more embodiments, a machine learning algorithm for determining a premises security system event is updated based on the determined area of interest.

Figure 5:
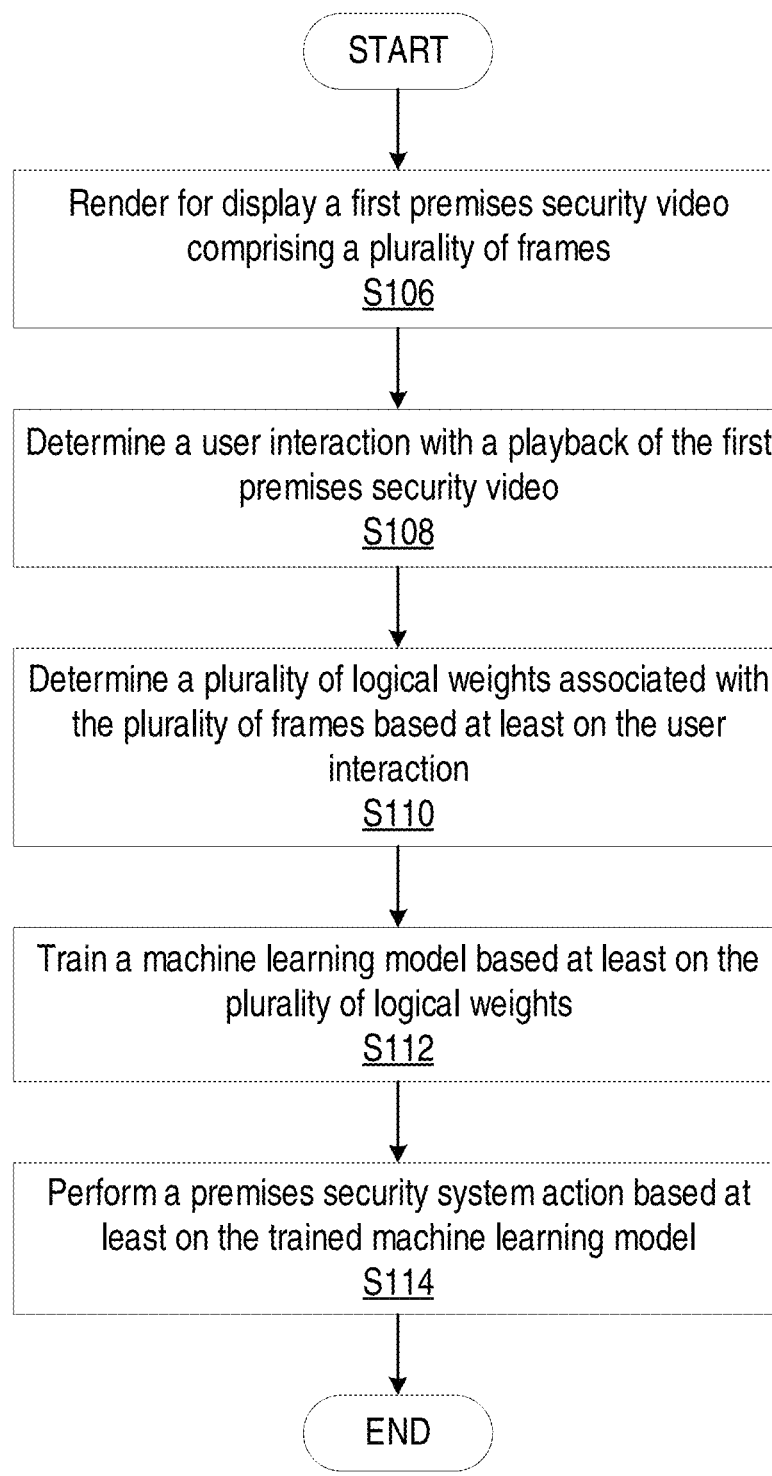
FIG. 5 is a flowchart of another example process according to some embodiments of the present disclosure.

FIG. 5 is a flowchart of an example process implemented by an interaction device 17 according to one or more embodiments of the present disclosure. One or more blocks described herein may be performed by one or more elements of interaction device 17 such as by one or more of processing circuitry 44 (including the interaction unit 19), processor 46, etc. Interaction device 17 is configured to render for display (Block S106) a first premises security video comprising a plurality of frames. Interaction device 17 is configured to determine (Block S108) a user interaction with a playback of the first premises security video. Interaction device 17 is configured to determine (Block S110) a plurality of logical weights associated with the plurality of frames based at least on the user interaction. Interaction device 17 is configured train (Block S112) a machine learning model based at least on the plurality of logical weights. Interaction device 17 is configured to perform (Block S114) a premises security system action based at least on the trained machine learning model.

According to one or more embodiments, the user interaction corresponds to at least one of viewing at least one of the plurality of frames, scrolling forward through at least one of the plurality of frames, scrolling backwards through at least one of the plurality of frames, zooming in on at least one of the plurality of frames, pausing at least one of the plurality of frames for at least a predetermined amount of time, or tagging at least one of the plurality of frames with a corresponding tag.

According to one or more embodiments, each user interaction type is associated with a corresponding one of a plurality of logical weight formulas.

According to one or more embodiments, at least one of the plurality of logical weight formulas is based at least on multiplying an amount of time a frame has been viewed by a user times a multiplier.

According to one or more embodiments, the interaction device 17 is further configured to perform the premises security system action by at least determining a frame of interest of the plurality of frames, generating a graphical display identifying at least the frame of interest, receiving a user input comprising at least one label associated with the frame of interest, and further training the machine learning model based at least on the at least one label.

According to one or more embodiments, the interaction device 17 is further configured to determine the frame of interest by at least determining a logical mean weight mean associated with the plurality of frames, and determining that the frame of interest has an associated logical weight that is greater than the logical weight mean.

According to one or more embodiments, the interaction device 17 is further configured to perform the premises security system action by at least predicting a premises security system alarm event based at least on the trained machine learning model and a second premises security video, and triggering at least one premises security system device 14 based at least on the premises security system alarm event.

Having described the general process flow of arrangements of the disclosure and having provided examples of hardware and software arrangements for implementing the processes and functions of the disclosure, the sections below provide details and examples of arrangements for determining areas of interest in video such as in a premises security system video based on a user's interaction with the video (e.g., interaction with playback of the video).

Some embodiments provide determining areas of interest in video such as in a premises security system video based on a user's interaction with the video.

One or more embodiments described herein provide for a method and system of determining areas of interest in video that may be securely and privately driven by users' interactions with video. Additional optimizations and enhancements may be provided based on the teachings described herein.

Next, a description of an example of generating a baseline for counting frame views of a video is provided.

In one example, playing the video exactly one time may result in row vector, size n, where n is equal to the number frames in the video. Each element would be equal to 1 given each frame was only viewed one time. Watching (½) of the video would result in a row vector, size n, where n is equal to the number frames in the video. Elements (0 . . . n/2) would have a value of 1, represented viewed and elements (n/2+1 . . . n) would have a value 0, which represents unviewed frames.

The above may be the starting point for the weighted ranking system of frames described herein.

Next, a description of an example of weighting the frames in response to seeking is provided.

Figure 6:
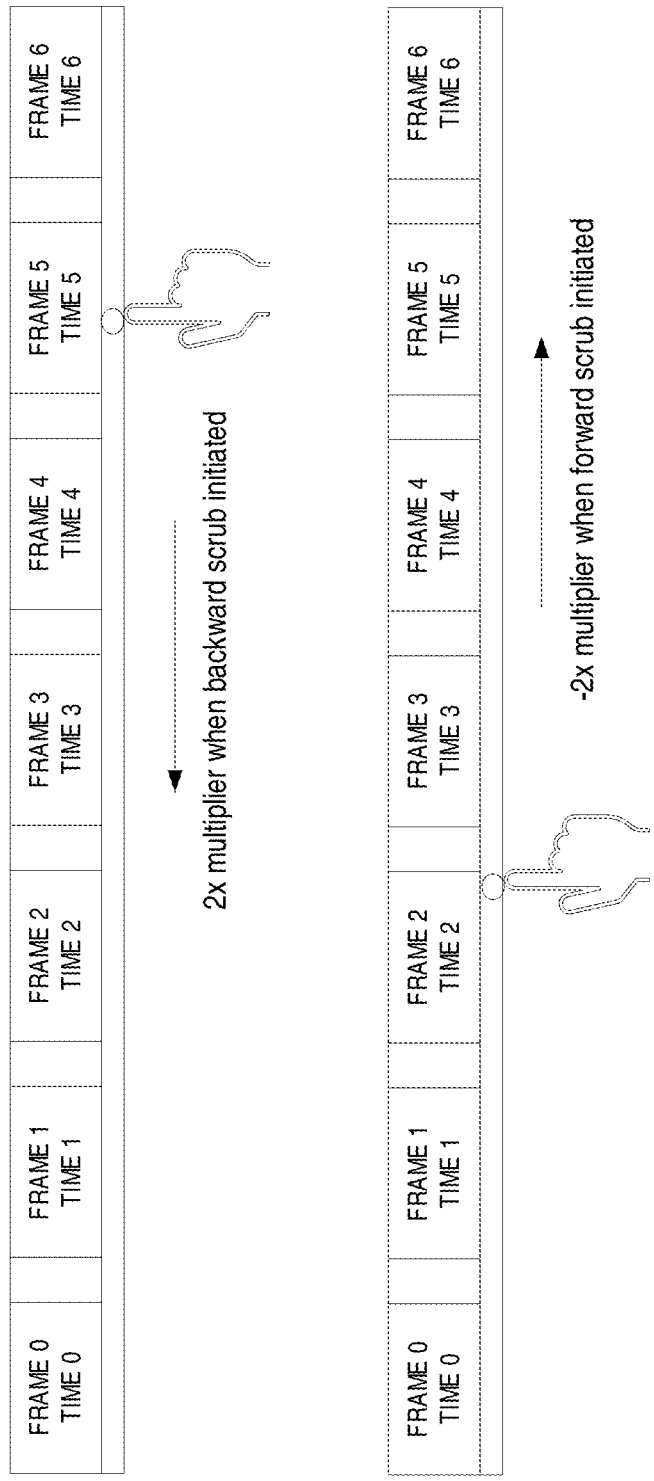
FIG. 6 is a diagram of an example user interaction according to some embodiments of the present disclosure.

If a user scrubs (e.g., scrolls) back in the video (e.g., rewinds, replays at least a portion of the video, etc.) to re-watch at least a portion of the video that potentially contains something of interest to the user, the view counts and logical weights may be adjusted (e.g., by interaction unit 19 and/or processing circuitry 44) for that portion of the vector (e.g., portion of the video). Conversely, if the user high speed scrubs forward over an area in the video, this interaction indicates that there is probably nothing of interest to the user in the area of the video, and the vector points (e.g., logical weights) can be adjusted downward by the interaction unit 19/processing circuitry 44. In one or more embodiments, rewinding the video may cause interaction unit 19/processing circuitry 44 to apply a 2× multiplier to each frame that is reviewed, [2](f . . . where f/e denotes the starting index of the new play point and (f/3) denotes the ending index. In one or more embodiments, scrubbing forward over the video may cause interaction unit 19/processing circuitry 44 to apply −2× multiplier to each frame skipped, [−2](f . . . f/e) where f denotes the starting index of the new play point and (f/e) denotes the ending index. i.e., the frames that were skipped. The scrubbing forward and backwards is illustrated in the example of FIG. 6. Further, other multiplier quantities are equally applicable according to the teachings of the present disclosure.

Next, a description of an example of weighting the frames in response to a user zoom action is provided.

Figure 7:
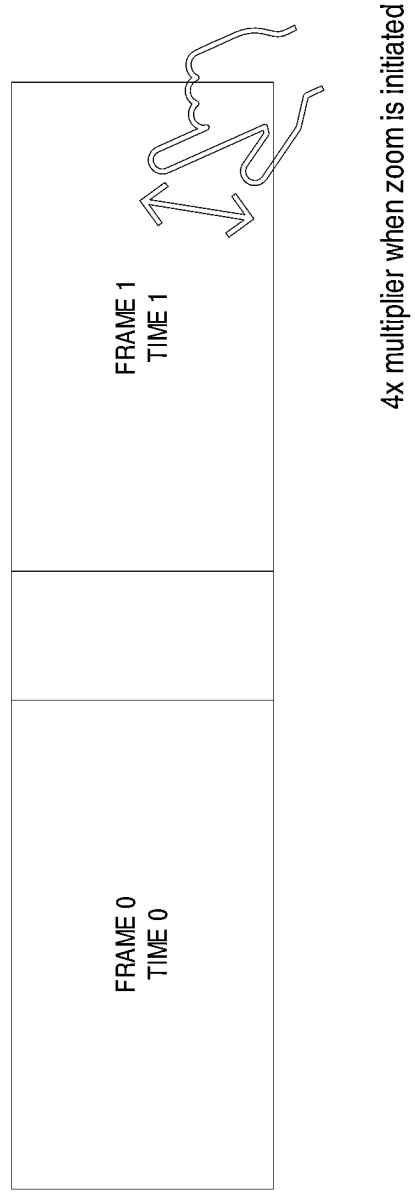
FIG. 7 is a diagram of another example of a user interaction according to some embodiments of the present disclosure.

Zooming into a portion of video may be considered a strong indicator that user is interested in that portion of the video. A 4× multiplier (or other predefined multiplier amount) may be applied to the frame when zooming is initiated by the user. In one example, given that most video has 30 frames per second it may be important to apply the 4× multiplier across a 2 second window to properly weight the frames of interest, [4](s . . . e) where s denotes zoomed frame index −30 and e denotes zoomed frame +30. FIG. 7 is a diagram of the multiplier when the user performs a zoom functions. Further, other multiplier quantities are equally applicable according to the teachings of the present disclosure.

Other user interactions with playback of a video may correspond to different weights, multipliers, etc., being applied to at least one frame of a video. For example, another multiplier may be used a user scrolls and/or scrubs back and forth between the same frames. In another example, a predefined multiplier amount is used if the interaction device 17 detects the user took a screenshot of a frame, which may indicate that there is something of interest in the frame.

Next, a description of an example of generating a histogram is provided.

Figure 8:
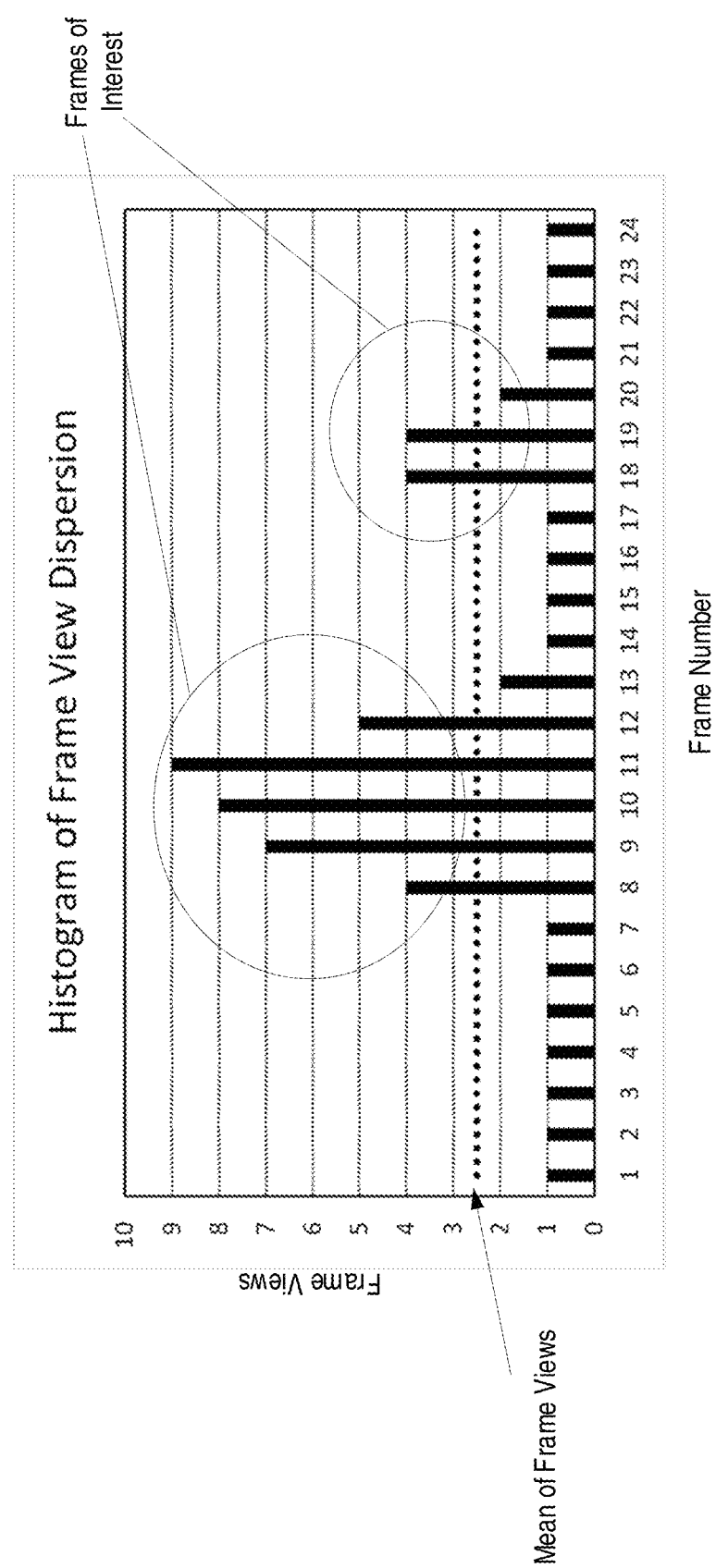
FIG. 8 is a diagram of an example of a histogram of a frame view dispersion according to some embodiments of the present disclosure.

Once a user's interaction with the video is complete, interaction unit 19 via processing circuitry 44 can build a histogram, find the mean, and determine the one or more frames of the video that are of interest. For example, the histogram may be a histogram of frame view dispersion where the number of frame views for each frame number is plotted. The frame view for one or more frame numbers may correspond to the resulting frame view after a respective logical weight has been applied, as described herein. In one or more embodiments, one or more areas of interest may correspond to data of one or more areas that are above the mean. FIG. 8 is a diagram of a histogram built by interaction unit 19 where areas of interest are identified.

Next, a description of an example of labeling an area of interest is provided.

In one or more embodiments, the baseline behavior or action performed by interaction device 17 could be to label these areas as an "Area of Interest" and provide such as an alert or notification to a user. In one or more embodiments, the user can label each area of interest to further refine the machine learning (ML) model. For example, when an area is determined to be an area of interest to the user, the user can be presented with the option to tag the area as an area of interest. Doing so can cause the ML algorithm to adjust itself to modify one or more predefined logical weights of one or more predefined user interactions for later use in determining areas of interest. Further, the ML algorithm may be updated to take this type of video into account when determining whether to generate and send an alarm/event alert in further occurrences.

As such, one or more embodiments described herein provide for identifying one or more areas of interest in at least a portion of the video based on a user's interaction with the video (e.g., interaction with playback of the video).

SOME EXAMPLES

Example A1. A device (e.g., interaction device 17), comprising:
  processing circuitry 44 configured to:
    assign (Block S100) at least one logical weight to at least one frame of a video based on a user's interaction with playback of the at least one frame of the video;
    determine (Block S102) an area of interest based at least on the assignment of at least one logical weight to at least one frame of the video; and indicate (Block S104) the determined area of interest.

Example A2. The interaction device 17 of Example A1, wherein the user's interaction with playback of the at least one frame of the video is defined as at least one predefined user interaction, the at least one predefined user interaction including at least one of:
  scrolling forward through the video;
  scrolling backwards through the video;
  zooming in on a portion of the video; and
  pausing the video on a specific frame for a predetermined amount of time.

Example A3. The interaction device 17 of Example A2, wherein each predefined user interaction corresponds to a different logical weight.

Example A4. The interaction device 17 of any one of Examples A1-A3, wherein an amount of the at least one logical weight that is assigned to at least one frame of the video is based on a type of user interaction with playback of the at least one frame of the video.

Example A5. The interaction device 17 of any one of Examples A1-A4, wherein the logical weight corresponds to multiplying an amount the at least one frame has been viewed by a predefined multiplier.

Example A6. The interaction device 17 of any one of Examples A1-A5, wherein the processing circuitry is further configured to generate a histogram of a frame view dispersion of the video; and
  the determination of the area of interest corresponding to at least one frame having a frame view quantity greater than a mean frame view quantity of a plurality of frames of the video.

Example B1. A method implemented by a device (e.g., interaction device 17), the method comprising:
  assigning at least one logical weight to at least one frame of a video based on a user's interaction with playback of the at least one frame of the video;

determining an area of interest based at least on the assignment of at least one logical weight to at least one frame of the video; and indicating the determined area of interest.

Example B2. The method of Example B1, wherein the user's interaction with playback of the at least one frame of the video corresponds to at least one predefined user interaction, the at least one predefined user interaction including at least one of:

scrolling forward through the video;

scrolling backwards through the video;

zooming in on a portion of the video; and pausing the video on a specific frame for a predetermined amount of time.

Example B3. The method of Example B2, wherein each predefined user interaction corresponds to a different logical weight.

Example B4. The method of any one of Examples B1-B3, wherein an amount of the at least one logical weight that is assigned to at least one frame of the video is based on a type of user interaction with playback of the at least one frame of the video.

Example B5. The method of any one of Examples B1-B4, wherein the logical weight corresponds to multiplying an amount the at least one frame has been viewed by a predefined multiplier.

Example B6. The method of any one of Examples B1-B5, wherein the processing circuitry is further configured to generate a histogram of a frame view dispersion of the video; and the determination of the area of interest corresponding to at least one frame having a frame view quantity greater than a mean frame view quantity of a plurality of frames of the video.

Example C1. A method implemented by a device (e.g., interaction device 17) for determining an area of interest in a premises based on a captured video, the method comprising:

determining an area of interest based at least on based on a user's interaction with playback of at least one frame of the video.

Example C2. The method of Example C1, wherein a machine learning algorithm for determining a premises security system event is updated based on the determined area of interest.

Example D1. A device (e.g., interaction device 17) for determining an area of interest in a premises based on a captured video, the device comprising:

processing circuitry configured to determine an area of interest based at least on based on a user's interaction with playback of at least one frame of the video.

Example D2. The interaction device 17 of Example D1, wherein a machine learning algorithm for determining a premises security system event is updated based on the determined area of interest.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware.

Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings.

It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings and the following claims.

What is claimed is:

1. A system comprising:
at least one device comprising processing circuitry configured to:
render for display a premises security video comprising a plurality of frames;
monitor a user interaction with a playback of the premises security video;
for each of the plurality of frames, determine a ranking for the frame based at least on an amount of the user interaction with the frame; and
train a machine learning model based at least on at least one ranking of the plurality of rankings for the plurality of frames to generate a trained machine learning model; and;
perform a premises security system action based at least on the trained machine learning model.

2. The system of claim 1, wherein the user interaction corresponds to at least one of:
viewing at least one of the plurality of frames;
scrolling forward through at least one of the plurality of frames;
scrolling backwards through at least one of the plurality of frames;
zooming in on at least one of the plurality of frames;
pausing at least one of the plurality of frames for at least a predetermined amount of time; or
tagging at least one of the plurality of frames with a corresponding tag.

3. The system of claim 1, wherein the ranking of each frame comprises assigning a logical weight to each frame.

4. The system of claim 3, wherein the user interaction corresponds to at least one of a plurality of types of user interactions, each type of user interaction being associated with a corresponding one of a plurality of logical weight formulas.

5. The system of claim 4, wherein at least one of the plurality of logical weight formulas is based at least on multiplying an amount of time a frame has been viewed by a user times a multiplier.

6. The system of claim 1, wherein the processing circuitry is further configured to perform the premises security system action by at least:
determining a frame of interest of the plurality of frames;
generating a graphical display identifying at least the frame of interest;
receiving a user input comprising at least one label associated with the frame of interest; and
further training the machine learning model based at least on the at least one label.

7. The system of claim 6, wherein the processing circuitry is further configured to determine the frame of interest by at least:
determining a logical mean weight mean associated with the plurality of frames; and
determining that the frame of interest has an associated logical weight that is greater than the logical weight mean.

8. The system of claim 1, wherein the processing circuitry is further configured to perform the premises security system action by at least:
predicting a premises security system alarm event based at least on the trained machine learning model and a second premises security video; and
triggering at least one premises security system device based at least on the premises security system alarm event.

9. A method implemented by a system, the method comprising:
rendering for display a premises security video comprising a plurality of frames;
monitoring a user interaction with a playback of the premises security video;
for each of the plurality of frames, determining a ranking for the frame based at least on an amount of the user interaction with the frame; and
training a machine learning model based at least on at least one ranking of the plurality of rankings for the plurality of frames to generate a trained machine learning model; and
performing a premises security system action based at least on the trained machine learning model.

10. The method of claim 9, wherein the user interaction corresponds to at least one of:
viewing at least one of the plurality of frames;
scrolling forward through at least one of the plurality of frames;
scrolling backwards through at least one of the plurality of frames;
zooming in on at least one of the plurality of frames;
pausing at least one of the plurality of frames for at least a predetermined amount of time; or
tagging at least one of the plurality of frames with a corresponding tag.

11. The method of claim 9, wherein the ranking of each frame comprises assigning a logical weight to each frame.

12. The method of claim 11, wherein the user interaction corresponds to at least one of a plurality of types of user interactions, each type of user interaction being associated with a corresponding one of a plurality of logical weight formulas.

13. The method of claim 12, wherein at least one of the plurality of logical weight formulas is based at least on multiplying an amount of time a frame has been viewed by a user times a multiplier.

14. The method of claim 9, further comprising performing the premises security system action by at least:
determining a frame of interest of the plurality of frames;
generating a graphical display identifying at least the frame of interest;
receiving a user input comprising at least one label associated with the frame of interest; and
further training the machine learning model based at least on the at least one label.

15. The method of claim 14, further comprising determining the frame of interest by at least:
  determining a logical mean weight mean associated with the plurality of frames; and
  determining that the frame of interest has an associated logical weight that is greater than the logical weight mean.

16. The method of claim 9, further comprising performing the premises security system action by at least:
  predicting a premises security system alarm event based at least on the trained machine learning model and a second premises security video; and
  triggering at least one premises security system device based at least on the premises security system alarm event.

17. A non-transitory, computer-readable storage medium comprising instructions configured to cause a system to:
  render for display a premises security video comprising a plurality of frames;
  monitor a user interaction with a playback of the premises security video;
  for each of the plurality of frames, determine a ranking for the frame based at least on an amount of the user interaction with the frame;
  train a machine learning model based at least on at least one ranking of the plurality of rankings for the plurality of frames to generate a trained machine learning model; and
  perform a premises security system action based at least on the trained machine learning model.

18. The non-transitory, computer-readable storage medium of claim 17, wherein the user interaction corresponds to at least one of:
  viewing at least one of the plurality of frames;
  scrolling forward through at least one of the plurality of frames;
  scrolling backwards through at least one of the plurality of frames;
  zooming in on at least one of the plurality of frames;
  pausing at least one of the plurality of frames for at least a predetermined amount of time; or
  tagging at least one of the plurality of frames with a corresponding tag.

19. The non-transitory, computer-readable storage medium of claim 17, wherein the user interaction corresponds to at least one of a plurality of types of user interactions, each type of user interaction being associated with a corresponding one of a plurality of logical weight formulas; and
  at least one of the plurality of logical weight formulas is based at least on multiplying an amount of time a frame has been viewed by a user times a multiplier.

20. The non-transitory, computer-readable storage medium of claim 17, wherein the instructions are configured to:
  perform the premises security system action by at least:
    determining a frame of interest of the plurality of frames by at least:
      determining a logical mean weight mean associated with the plurality of frames; and
      determining that the frame of interest has an associated logical weight that is greater than the logical weight mean; and
    generating a graphical display identifying at least the frame of interest;
    receiving a user input comprising at least one label associated with the frame of interest; and
    further training the machine learning model based at least on the at least one label.

* * * * *